Sept. 17, 1957  G. M. MILLER  2,806,396
PERMANENT MAGNET FOR USE WITH SOCKET WRENCHES, CONVEYOR
BELTS, EXTENSION TUBES, AND THE LIKE
Filed May 6, 1954
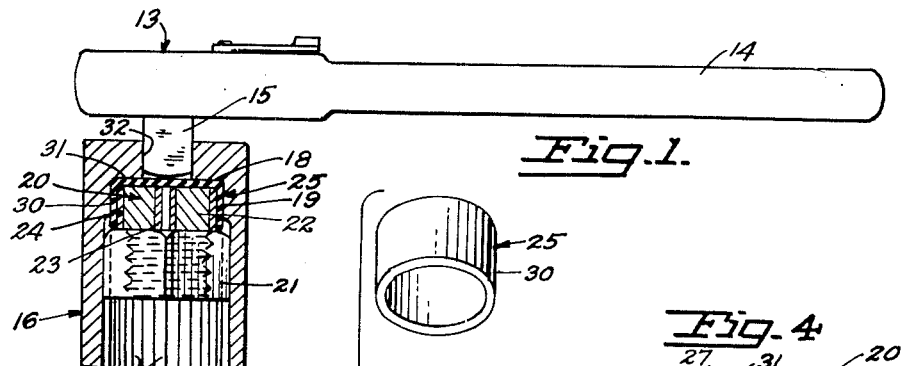
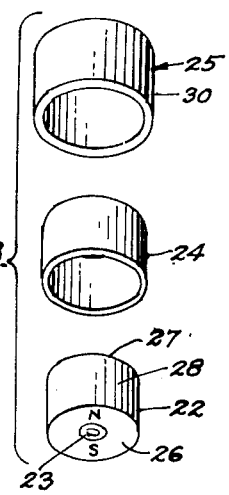
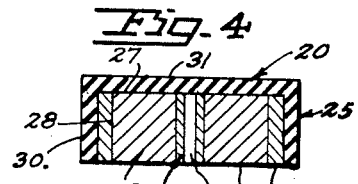
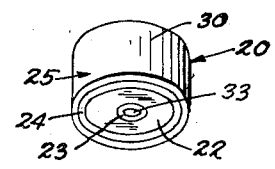
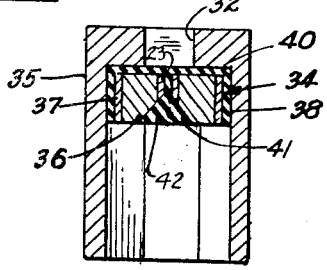
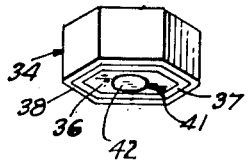
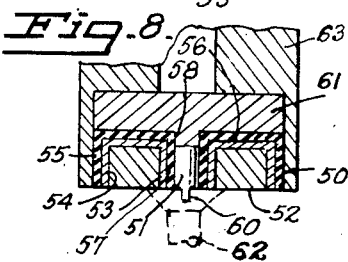
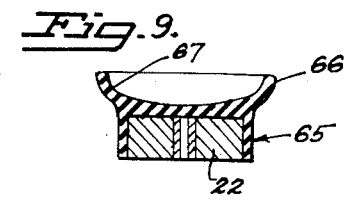
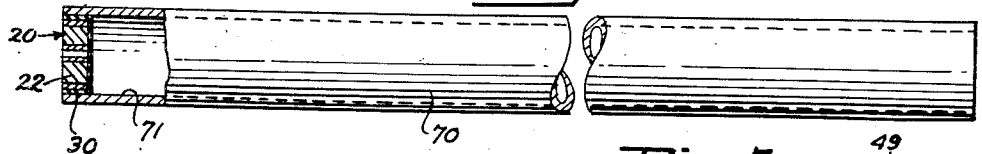
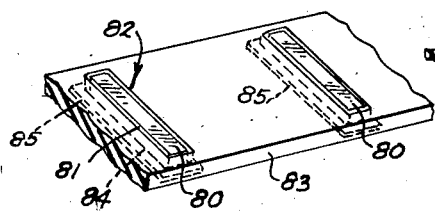
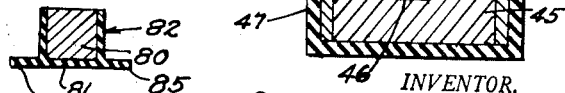
INVENTOR.
GEORGE M. MILLER
BY
ATTORNEY.

United States Patent Office 2,806,396
Patented Sept. 17, 1957

2,806,396

PERMANENT MAGNET FOR USE WITH SOCKET WRENCHES, CONVEYOR BELTS, EXTENSION TUBES, AND THE LIKE

George M. Miller, Castro Valley, Calif.

Application May 6, 1954, Serial No. 428,078

12 Claims. (Cl. 81—125)

This invention relates to improvements in permanent magnets. It has particular applicability to tools such as socket wrenches, screw drivers, and the like, wherein a permanent magnet is employed to temporarily maintain articles such as cap screws, threaded screws of all types, and nuts in engagement with the driving portion of the tool, so that the tool may be used to set the screws and nuts in place preparatory to or after rotation of the tool, when securing them to or removing them from an object. My invention may also be used with other devices where permanent magnets are desirable.

Modern permanent magnets have much greater strength or coercive force than did the magnets that had been known prior to about 1934, because they are made from new magnetic alloys. However, these new alloys are relatively brittle, and therefore, the magnets tend to be easily broken. They are unable to withstand the torsional force exerted on a screw driver tip or wrench wall when driving a screw or nut into its engaged position. Moreover, the vibratory forces and mechanical shocks encountered when using sockets or screw drivers with impact driving tools of the power type have also tended to break the magnets. Even if it does not break them, this vibration demagnetizes them somewhat, unless they have already been specially stabilized at a somewhat lower flux density than they would have had and at an equal or greater vibratory frequency than they are to be subjected to in use, resulting in a flux density somewhat lower than in the magnets not so stabilized. This is an expensive process and reduces the coercive force of the magnet. As a result of these problems, few socket wrenches or screw drivers have been equipped with magnets, and these tools have been relatively expensive. Also, when so equipped, the breakage rate has been high, and partial demagnetization of the magnets have made replacement necessary, often after relatively short periods of use.

Heretofore, the best approach in this field had been to mount the magnets on expensive spring arrangements. This mounting could not be used with the sockets and driver heads already in use; the whole assembly had to be specially made. There was no suitable way by which magnets could be inserted into sockets that were already on the market, and a mechanic who wished to have a magnetized socket had to buy an entire new set of very expensive sockets.

These problems have been solved by the present invention, which provides a new type of permanent magnet unit. In this invention the magnet is mounted inside a synthetic rubber cushioning jacket and covered by it except for the working face. The resilient jacket acts as a shock absorber and vibration dampener and thereby solves two of the most important problems involved in power impact wrenches. By dampening the vibrations and absorbing the shock of impact, the present invention prevents both the breakage of magnets and the loss of their magnetization, so that much greater economy is effected.

Preferably, the invention also includes encasing at least the side walls of the magnet in a shielding tube or case of nonmagnetic metal, preferably located between the magnet and the rubber jacket. In addition, when using a rotor-type or disk type magnet with central holes therethrough, it is preferable to have a nonmagnetic shield sleeve in the hole, to deflect stray magnetic fields and prevent premature demagnetization of the magnet.

The rubber jacket of this invention provides a means for adapting permanent magnets to sockets that are already on the market, so that a mechanic owning a set of good sockets need buy only the magnet inserts, and so that manufacturers putting out a line of sockets may incorporate a magnet as a part of the socket without having to change their socket designs. The peripheral surface of the rubber sets up sufficient friction to engage the side wall of the socket and hold the device in place. Yet, the magnet is still removable from the socket when a mechanic desires to use the socket without it.

The invention also has applicability elsewhere than in sockets and drivers. For example, conveyor belts used to convey small iron and steel parts up inclines may employ magnets to retain the parts on the belt without slipping. The present invention provides magnet inserts that can be installed in ready-made conveyor belts. The present invention also provides magnets adapted for insertion into steel or other tubing to provide a magnet at one end thereof and provides a permanent magnet assembly that can be mounted on glass or other places where no holes can be driven and will be held in position by suction means.

Other objects and advantages of the invention will appear from the following description and from the drawings in accordance with 35 U. S. C. 112.

In the drawings:

Fig. 1 is a view in elevation and partly in section of a socket wrench incorporating within a twelve-point socket a permanent magnet assembly embodying the principles of the present invention and showing the magnet holding a hexagonal nut in the socket.

Fig. 2 is a view in perspective of the magnet assembly used in the device of Fig. 1.

Fig. 3 is an exploded view in perspective of the magnet assembly of Fig. 2 showing its component parts.

Fig. 4 is a somewhat enlarged central vertical section of the magnet shown in Fig. 2.

Fig. 5 is a central vertical section of a modified form of socket, namely, a hexagonal socket, instead of the twelve-point socket shown in Fig. 1, employing a slightly modified form of magnet.

Fig. 6 is a view in perspective of the hexagonal magnet assembly used in the socket in Fig. 5.

Fig. 7 is a view in perspective and in section of a modified form of magnet for use in the socket of Fig. 1 or in other applications where it would be more advantageous to use the round U type of magnet in place of the rotor type of magnet.

Fig. 8 is a central vertical section of a magnet assembly used with a screw driver, the latter being shown partly in elevation and a screw head being shown in broken lines.

Fig. 9 is a central vertical section of another modified form of magnet adapted for suction cup mounting.

Fig. 10 is a view in elevation and partly in section of one of the magnets of Fig. 2 installed in one end of a piece of tubing so that the magnet may be used at a considerable distance from the opposite end of the tubing, as in probing for iron and steel articles therewith.

Fig. 11 is a fragmentary view in perspective of a portion of a conveyor belt adapted to convey small metal pieces up an incline and incorporating rectangular magnets made according to the principles of the present invention.

Fig. 12 is an enlarged transverse vertical section of one of the magnets used in Fig. 11.

The permanent magnet provided by the present invention is so versatile that only a few of its uses can be illustrated herein, but it is believed that these illustrations will suffice for an understanding of the basic principle.

One important use is shown in Fig. 1 which shows a socket wrench 13 with a handle 14 whose ratchet key 15 engages a drive opening 32 in a socket 16. The socket 16 may be a twelve-point socket as shown, or may be square or hexagonal or eight-point, providing polygonal serrations 17. The socket 16, however, has at its inner end a base shelf or shoulder 18 forming the bottom limits of a substantially cylindrical cavity 19 which communicates with the drive opening 32, the serrations 17 stopping short of the shoulder 18.

A magnet assembly 20 embodying the principles of this invention, may be installed in the socket 16 in the cylindrical cavity 19 and against the shoulder 18, so that the magnet assembly 20 will hold a nut 21 magnetically and thereby enable it to be inserted directly in the socket 16, and then threaded around its screw or bolt, instead of having first to be threaded on by hand. A cap screw may be handled in exactly the same manner. Similarly, during an unthreading operation the screw or nut will also be held in the socket 16 after removal from its threads. The cylindrical cavity 19 is not a necessity, for the same type of magnet assembly 20 will fit directly into a twelve-point socket without such a cavity, so long as the proper size magnet assembly 20 is used.

The magnet assembly 20, shown in more detail in Figs. 2, 3, and 4, is generally in the shape of a hollow cylindrical disk, and includes a disk or rotor type of permanent magnet 22, with an inner nonmagnetic shield or sleeve 23, and an outer nonmagnetic shield or sleeve 24, and a rubber cushion, jacket, or case 25.

The magnet 22 may be bought on the market, the present invention making it possible to use either sintered, cast, rolled, die-formed, machined or other types of magnets in applications where, heretofore, permanent magnets could not be used at all because of their being subject to vibrations or shock impact. Magnets of various shapes may be used as will be shown later on. Preferably, the magnet 22 is magnetized widthwise or along its face 26 instead of axially, though it may be magnetized in any direction, most applicable to the use for which intended. The north and south poles may be as indicated in Fig. 3.

The sleeves 23 and 24 may be made from brass, pot metal, aluminum or any other nonmagnetic metal or alloy. The inner sleeve 23 prolongs the life of the magnet 22 by achieving a better separation of the north and south poles. The outer sleeve 24 serves to prolong the life of the magnet 22 by reducing the tendency to demagnetization caused by close use in connection with sockets made of iron and steel. The sleeve 24 also serves to strengthen the pull of the magnet 22 at its face 26 by shielding it from this demagnetizing tendency. The sleeve 24 may also cover the bottom face 27 of the magnet as well as the side periphery 28, especially if excessive vibrational forces are present, but this is not normally necessary. The sleeves 23 and 24 may be bonded to the magnet 22 by any suitable means.

One of the most important features of the present invention is the use of the rubber cushion or case 25. The cushion 25 may be made from any suitable synthetic or natural rubber material, and it may be bonded to the sleeve 24 (or directly to the magnet 22 if the sleeve 24 is omitted), or it may simply be made to size and slipped around the magnet 22 or sleeve 24. The rubber case 25 preferably has a cylindrical wall 30 and an end wall 31, so that only one planar face 26 of the magnet 22 is unenclosed. This eliminates shock from all directions except the direct connection between the magnet 22 and the nut 21 or capscrew where shock absorption is not necessary.

The combination of the magnet 22 and the case 25 has the following principal advantages:

1. The case 25 acts as a shock absorber that prevents the magnet 22 from being broken due to direct shock. In other words, the rubber case 25 acts as a cushion providing a resilient seat for the magnet 22 on the socket shelf or shoulder 18.

2. The rubber case 25 acts as a vibration dampener absorbing the vibrations set up in power impact wrenches, and prevents these vibrations from demagnetizing the magnet 22. This is necessary, because otherwise the magnet 22 must be stabilized for higher-frequency vibrations, resulting in a lower coercive force, and even then there is danger of its losing its magnetization from excessive vibration. Stabilization itself is always an expensive process and always reduces somewhat the initial strength of the magnet.

3. The outer periphery of the wall 30 of the rubber case 25 engages the periphery of the cavity 19 of the socket 16 in a friction fit that holds the magnet assembly 20 in the socket 16 without any other means being necessary. The friction fit applies as well when the socket has no cylindrical cavity 19, for when the proper size of magnet assembly is chosen, it will fit directly into the twelve-point portion of the socket. This eliminates the necessity for screws and other such means for holding the magnet 22 in the socket 16. It also means that the magnet assembly 20 can be put in or taken out of the socket 16 at will. It is forced in place simply by pushing it in from the open end of the socket 16, and it may be ejected from behind by poking a rod in through the driving opening 32 in the rear end of the socket 16. This means that the magnet assembly 20 may be removably installed in any socket of the correct size.

4. Because of this removability, the magnet assembly 20 can be bought separately and installed in a socket already on hand. The socket sizes are standard, and the magnet assemblies 20 can be made in a series of sizes so that each size of socket 16 can be accommodated.

5. If desired by the manufacturer, the magnet assembly 20 may be cemented, vulcanized, or rubber welded by any of the available industrial processes. This is made possible by the rubber casing 25. Then it is permanently installed in the socket 16. This will normally be done where the sockets 16 are used on an assembly line for a single type of operation and elsewhere where permanent installation is desirable.

It will be apparent from the preceding description how the present invention is used. The sleeve 23 is inserted in the magnet 22, and the magnet 22 is inserted in or encompassed by the sleeve 24, if shielding sleeves are used, and is then inserted into the rubber cushion jacket 25, with the one face 26 uncovered. The magnet assembly 20 is then inserted in the socket 16 with the rubber end wall 31 abutting against the shoulder 18 and the uncovered face 26 faces the open end of the socket 16. The rubber jacket 25 then serves as a cushion between the magnet 22 and the shoulder 18, and the wall 30 serves to hold the magnet assembly 20 in place so that it will not fall out, as well as dampening the vibrations and protecting the magnet 22 against shock.

The nut 21 or cap screw may then be inserted in the socket and if ferromagnetic, will contact the magnet face 26 and be held thereby. The operation can then proceed, the wrench 13 being used both to position a nut 21 or cap screw with respect to a threaded stud or socket and subsequently to tighten it. When tightening is completed, the wrench 13 is pulled away, and, the magnetic force being less than the frictional force between the rubber wall 30 and the socket 16, the magnet will stay seated against the shoulder 18 as the workpiece 21 leaves the socket 16. When nuts 21 or capscrews are to be removed, the magnet assembly 20 holds the nut 21 in the socket 16 after removal, until taken out of the socket.

Figs. 5 and 6 show a modified form of magnet assembly 34 adapted for use in a hexagonal socket 35 which has no round portion like the cavity 19. Here the magnet assembly 34 is preferably made hexagonal, or a round magnet is used in a hexagonal adapter. The assembly 34 may include a hollow hexagonal magnet 36 with an inner shielding sleeve corresponding to the sleeve 23 in Figs. 1–4, and an outer hexagonal shield 37, rubber cap or hexagonal jacket 38, or a round shielded magnet may be used inside a round recess in a rubber jacket having a hexagonal outer periphery. The peripheral wall of the rubber cup 38 serves to hold the magnet assembly 34 inside the socket 35 against a shelf 40 with the magnetic holding surface exposed. As in the previous example, the rubber cup 38 also serves as a cushion to damp vibrations and absorb shock. In addition, the magnet 36 may be provided with a central partly conical cavity 41 filled with a cushion portion 42 integral with the jacket 38. This cushion portion 32 acts to absorb shock resulting from contact with the portion of the bolt that projects beyond the nut after the nut has been threaded on, and can be used with any of the magnets shown. The magnet assembly 34 may be removable at will or may be permanently bonded to the walls of the socket 35.

Fig. 7 shows another modified form of magnet assembly 44 and includes a slightly different type of magnet 45, known as a round U. Here, a magnet 45 is a solid circular disk, although it could have another shape, and in order to maintain polarity and eliminate disturbing fields, a diametric slot 46 is formed in the work-engaging surface of the disk. This slot 46 is made use of to link a rubber cup 47 more intimately to the magnet 45. Diametrically aligned slots are provided in a sleeve 48, and the rubber cup 47 has a diametric portion 49 filling the magnet slot 46 and the aligned slots in the sleeve 48. This particular form of the invention is especially useful with shear tables, assembly tables, forms and the like.

Fig. 8 illustrates the use of a magnet assembly 50 with a screw driver attachment 51 that can be used in any standard twelve point or six point socket of appropriate size. For a twelve point socket 63, a round magnet assembly 50 is preferable; for a hexagonal socket like the socket 35, a hexagonal magnet like the assembly 34 is preferable. Here the magnet assembly 50 is provided with a hollow magnet 52, an inner sleeve shield 53, an outer shielding sleeve 54 of nonmagnetic metal, and an annular rubber cup 55. In this instance the shielding sleeves 53 and 54 are connected by an annular end wall 56 covering the rear face of the magnet 52, but this is not absolutely necessary. The annular rubber cup 55 covers the peripheral surface of the shield 54 and the outer surface of the end wall 56, and has a tubular portion 57 covering the inner periphery of the inner shield sleeve 53. The tubular portion 57 has a round opening 58 through which extends the screw driver shank and its outer driving end 60. The attachment 51 includes a twelve-point or hexagonal drive plate 61, which preferably is permanently welded or otherwise rigidly secured to the driver shank. The rubber tube purtion 57 of the cup 55 insulates the magnet 52 from shock that may be transmitted through the blade 60. The rubber may be frictionally engaged with the driver attachment 51 or for permanent installations it may be welded, vulcanized, or cemented thereto. The screw-driver blade 60 is shielded from the magnet 50. In operation, the magnet 52 directly attracts and holds the ferromagnetic screw 62, the screw head bridging the central opening through the magnet 52. This aids in starting the screw 62 into the wood, metal, or other substance into which it is being driven.

Fig. 9 shows another modified form of magnet assembly 65 substantially like the magnet assembly 20, except that a rubber cup 66 is provided on its rear face with a suction cup 67, so that it can be mounted on glass or other surfaces without using screws. In this way the magnet assembly may be installed in any desired location.

Fig. 10 shows a magnet assembly 20 installed in one end of a tubular member 70, such as iron or brass pipe. The rubber wall 30 of the magnet assembly 20 engages an inner wall 71 of the pipe 70 in a friction fit. The tube 70 may be used as a probe or in any similar situation which requires the use of an elongate member having a magnet at one end.

The invention is also applicable to rubber conveyor belts as shown in Figs. 11 and 12. Usually in this kind of structure it is desirable to use bar magnets 80, preferably of the rectangular type having a square cross section. However, the shape of the magnet would be governed by the over-all design of the belt and the purpose for which it is intended. The bar magnet 80 may be mounted in a nonmagnetic shield-socket (not shown here) or may be directly mounted in a rubber cup 81, preferably by rubber welding, to provide an assembly 82. The conveyor belt 83 may be provided with recesses 84 in any desired manner or pattern, and the complete magnet unit 82 installed in these recesses 84. The recesses 84 may be holes extending all the way through the belt 83, as shown, especially where thin belt stock is used. Where the recesses 84 do extend all the way through the belt, the rubber cup 81 is preferably provided with flanges 85 that engage the rear surface of the belt 83. My new combination enables the user to obtain any pattern of magnet disposition he wishes. He can buy the assemblies 82 of the magnets 80 and their rubber jackets 81, and such an assembly 82 will provide an inexpensive magnet installation because it requires no screws, each assembly simply being cemented in place.

To those skilled in the art to which this invention relates, many changes in construction and widely differing embodiments and applications of the invention will suggest themselves without departing from the function and scope of the invention. For example, it applies to any shape of magnet and any type of tool or other installation. The disclosures and the description herein are purely illustrative and are not intended to be in any sense limiting.

I claim:

1. A magnet assembly, including in combination a permanent magnet having a flat disk shape, the disk having two faces and an outer peripheral wall, a sleeve of nonmagnetic metal encircling the peripheral wall of said magnet, and a rubber cup having a portion encircling said sleeve and an end wall covering one face of said magnet so that only the other face of said magnet is exposed.

2. The assembly of claim 1 wherein said magnet is cylindrical between said faces.

3. The assembly of claim 2 wherein said magnet has a central cylindrical opening therethrough and a second sleeve of non-magnetic metal fitting snugly in said opening, the first-mentioned sleeve and the sleeve-encircling portion of said rubber cup forming hollow cylinders.

4. The assembly of claim 1 wherein said rubber cup is bonded to said magnet and said sleeve.

5. The assembly of claim 1 wherein said disk-shaped magnet is in the form of a round U having as one of its faces a contact face divided into two areas of opposite polarity by a diametric slot, said sleeve having a pair of diametrically opposite recesses in line with said slot, and said cup member having a portion filling said recesses and said slot flush with said contact face.

6. The assembly of claim 1 wherein said magnet has a central tubular opening therethrough, a second sleeve of non-magnetic metal fitting snugly therein, said cup having an opening therethrough in line with said tubular opening, and a screwdriver having a shank portion extending through said openings and a head portion extending therebeyond.

7. A tool, comprising a wrench socket and a magnet assembly removably secured therein adjacent the inner end thereof, said magnet assembly comprising a permanent magnet having a contact face and an opposite face and an axial periphery, a nonmagnetic metal sleeve encompassing at least the axial periphery, and a rubber cup enclosing said magnet and said sleeve and exposing only the contact face of said magnet, the side walls of said rubber cup engaging the inner side walls of said socket in a frictional fit, the force of said friction being greater than the coercive force of said magnet.

8. A tool, comprising a wrench socket and a magnet assembly therein adjacent the inner end thereof, said magnet assembly comprising a permanent magnet having a contact face and an opposite face and an axial periphery, a nonmagnetic metal sleeve encompassing at least the axial periphery, and a rubber cup enclosing said magnet and said sleeve, and bonded thereto, exposing only the contact face of said magnet, the side walls of said rubber cup being bonded to the inner side walls of said socket.

9. A magnet assembly including in combination a prism-shaped permanent magnet generally polygonal in cross section; a sleeve of nonmagnetic metal encompassing the periphery of said magnet and having a generally polygonal cross section; and a cushioning cup of rubber having a wall portion polygonal in cross section and encompassing said sleeve, and said cup having a base portion covering one face of said magnet so that only the other face of said magnet is exposed.

10. A tool comprising a polygonal wrench socket and a magnet assembly therein, said magnet assembly comprising a permanent magnet having a contact face and an opposite face and an axial periphery, a nonmagnetic metal sleeve encompassing at least the axial periphery, and a rubber cup in which said magnet and said sleeve are encased, exposing only the contact face of said magnet, outer side walls of said rubber cup forming a tube polygonal in cross section and engaging inner side walls of said socket.

11. A magnet assembly including in combination a permanent magnet having a front face, a rear face, an axial face, a central axial opening therethrough, and a central conical cavity in said front face, a sleeve of nonmagnetic metal encompassing the axial faces of said magnet, an inner sleeve of nonmagnetic metal in said central axial opening, and a cushioning cup of rubber having a portion encompassing said outer sleeve, a portion covering said rear face of said magnet and a portion filling said conical cavity and the opening through said inner sleeve.

12. A magnet assembly, including in combination a permanent magnet having a flat disk shape and a generally polygonal cross section on a plane extending between and parallel to its flat faces, said magnet having a central opening therethrough, a first sleeve of nonmagnetic metal fitting snugly in said opening, a second sleeve of nonmagnetic metal encircling the periphery of said magnet, and a rubber cup having a portion encircling said second sleeve and an end wall covering one face of said magnet so that only the other face of said magnet is exposed.

References Cited in the file of this patent

UNITED STATES PATENTS

| | | |
|---|---|---|
| 2,217,514 | Henry | Oct. 8, 1940 |
| 2,260,055 | Reardon | Oct. 21, 1941 |
| 2,288,688 | Dubilier | July 7, 1942 |
| 2,474,942 | Hawkins | July 5, 1949 |
| 2,597,876 | Kurkjian | May 27, 1952 |
| 2,671,483 | Clark | Mar. 9, 1954 |
| 2,676,504 | Brugge et al. | Apr. 27, 1954 |
| 2,678,578 | Bonanno | May 18, 1954 |